US012580747B2

(12) United States Patent
Tanaka et al.

(10) Patent No.: US 12,580,747 B2
(45) Date of Patent: Mar. 17, 2026

(54) COMMUNICATION SYSTEM, INFORMATION PROCESSING DEVICE, INFORMATION PROCESSING METHOD, AND COMPUTER PROGRAM FOR VERIFYING EDGE DATA

(71) Applicant: KABUSHIKI KAISHA TOSHIBA, Tokyo (JP)

(72) Inventors: Yasuyuki Tanaka, Kawasaki Kawagana (JP); Mitsuru Kanda, Kita Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 223 days.

(21) Appl. No.: 18/174,882

(22) Filed: Feb. 27, 2023

(65) Prior Publication Data

US 2023/0412369 A1 Dec. 21, 2023

(30) Foreign Application Priority Data

Jun. 20, 2022 (JP) ................................. 2022-098867

(51) Int. Cl.
H04L 9/08 (2006.01)
H04L 9/32 (2006.01)
(52) U.S. Cl.
CPC .......... H04L 9/0838 (2013.01); H04L 9/3247 (2013.01)
(58) Field of Classification Search
CPC ... H04L 9/0838; H04L 9/3247; H04L 9/0825; H04L 9/40; H04L 63/0428; H04L 63/123; H04L 63/126; H04L 63/166; H04L 9/3242

(Continued)

(56) References Cited

U.S. PATENT DOCUMENTS

| | | | |
|---|---|---|---|
| 6,092,191 A | 7/2000 | Shimbo et al. | |
| 2008/0098228 A1* | 4/2008 | Anderson | ............. H04L 9/0891 |
| | | | 713/172 |

(Continued)

FOREIGN PATENT DOCUMENTS

| | | |
|---|---|---|
| JP | H9-214556 A | 8/1997 |
| JP | 2011-66703 A | 3/2011 |

(Continued)

OTHER PUBLICATIONS

E. Rescorla, "The Transport Layer Security (TLS) Protocol Version 1.3," IETF RFC 8446, 160 pages, URL:https://www.rfc-editor.org/rfc/rfc8446 (2018).

(Continued)

*Primary Examiner* — Bryan F Wright
(74) *Attorney, Agent, or Firm* — Finnegan, Henderson, Farabow, Garrett & Dunner, LLP

(57) ABSTRACT

A communication system according to an embodiment includes an edge device generating edge data and a service device making use of the edge data. The edge device generates a message authentication code by using a shared key shared with the service device. The edge device transmits first communication data representing communication data in which the message authentication code is assigned to the edge data. The service device verifies source of generation of the edge data included in the first communication data. The verification is performed in accordance with verification result of verifying the message authentication code included in the first communication data by using a shared key shared with the edge device.

17 Claims, 12 Drawing Sheets

(58) Field of Classification Search
USPC .......................................................... 713/171
See application file for complete search history.

(56) References Cited

U.S. PATENT DOCUMENTS

| | | | |
|---|---|---|---|
| 2011/0066856 A1 | 3/2011 | Yao et al. | |
| 2015/0033019 A1 | 1/2015 | Oguma et al. | |
| 2015/0195267 A1 | 7/2015 | Miyata | |
| 2016/0205194 A1 | 7/2016 | Kishikawa et al. | |
| 2020/0153623 A1* | 5/2020 | Asanghanwa | H04L 9/3213 |
| 2021/0240821 A1 | 8/2021 | Ito et al. | |
| 2022/0292346 A1* | 9/2022 | Mimassi | G06N 3/098 |
| 2023/0353376 A1* | 11/2023 | Marotzke | H04L 9/3213 |

FOREIGN PATENT DOCUMENTS

| | | | |
|---|---|---|---|
| JP | 2013-211748 A | 10/2013 | |
| JP | 2018-186486 A | 11/2018 | |
| JP | 2019-61538 A | 4/2019 | |
| JP | 2019-193083 A | 10/2019 | |
| WO | WO 2012/153530 A1 | 11/2012 | |
| WO | WO 2013/111364 A1 | 1/2013 | |
| WO | WO 2014/017532 A1 | 1/2014 | |
| WO | WO 2015/170451 A1 | 11/2015 | |
| WO | WO 2018/173603 A1 | 9/2018 | |

OTHER PUBLICATIONS

M. Jones et al., "JSON Web Signature (JWS)," IETF RFC 7515, 59 pages, URL:https://datatracker.ietf.org/doc/html/rfc7515 (2015).

J. Schaad, "Cbor Object Signing and Encryption (COSE)," IETF RFC 8152, 121 pages, URL:https://datatracker.ietf.org/doc/html/rfc8152 (2017).

Japan Patent Office, Office Action in JP App. No. 2022-098867 (Jul. 1, 2025).

Japan Patent Office, Office Action in JP App. No. 2022-098867 (Nov. 4, 2025).

* cited by examiner

FIRST KEY MANAGEMENT INFORMATION

| COMMUNICATION PARTNER IDENTIFICATION INFORMATION | SHARED KEY ID | SHARED KEY VALUE | VALIDITY |
|---|---|---|---|
| SERVICE DEVICE A | 100 | AAAAAAAAAA | 05/25/2022 23:00 |
| SERVICE DEVICE B | 200 | BBBBBBBBBB | 06/01/2022 2:00 |
| SERVER DEVICE C | 100 | CCCCCCCCC | 08/04/2022 11:30 |

FIG.4A 40A (40)

| EDGE DATA | MESSAGE AUTHENTICATION CODE FOR SERVICE DEVICE A | MESSAGE AUTHENTICATION CODE FOR SERVICE DEVICE B |
|---|---|---|

| EDGE DATA | MESSAGE AUTHENTICATION CODE FOR SERVICE DEVICE A |
|---|---|

40A2 (40A, 40)

| EDGE DATA | MESSAGE AUTHENTICATION CODE FOR SERVICE DEVICE B |
|---|---|

FIG.4C 40B (40)

| EDGE DATA | EDGE DATA | EDGE DATA | DIGITAL SIGNATURE |
|---|---|---|---|

<u>32A</u>

THIRD KEY MANAGEMENT
INFORMATION

| COMMUNICATION PARTNER IDENTIFICATION INFORMATION | SHARED KEY ID | SHARED KEY VALUE | VALIDITY |
|---|---|---|---|
| EDGE DEVICE A | 100 | CCCCCCCCC | 08/04/2022 11:30 |

FIG.7

EDGE DATA
MANAGEMENT
INFORMATION 32B, 22B

| GENERATION TIMING | RECEPTION TIMING | EDGE DATA | GENERATION SOURCE VERIFICATION COMPLETED | MESSAGE AUTHENTICATION CODE | DIGITAL SIGNATURE |
|---|---|---|---|---|---|
| 04/10/2022 11:10 | 04/11/2022 1:00 | AAAAA | ✓ | SERVER aaaaa | (N/A) |
| 03/01/2022 0:00 TO 03/31/2022 23:59 | 04/11/2022 2:00 | BBBBB········ | ✓ | (N/A) | bbbbbbbbbbbbbbbbbb |
| 04/15/2022 10:00 | 04/11/2022 3:00 | CCCCC | | SERVICE 1 - ccccc; SERVICE 2 - ddddd | (N/A) |

22A

SECOND KEY MANAGEMENT
INFORMATION

| COMMUNICATION PARTNER IDENTIFICATION INFORMATION | SHARED KEY ID | SHARED KEY VALUE | VALIDITY |
|---|---|---|---|
| EDGE DEVICE A | 100 | AAAAAAAAAA | 05/25/2022 23:00 |

COMMUNICATION SYSTEM, INFORMATION PROCESSING DEVICE, INFORMATION PROCESSING METHOD, AND COMPUTER PROGRAM FOR VERIFYING EDGE DATA

CROSS-REFERENCE TO RELATED APPLICATIONS

This application is based upon and claims the benefit of priority from Japanese Patent Application No. 2022-098867, filed on Jun. 20, 2022; the entire contents of which are incorporated herein by reference.

FIELD

Embodiments described herein relate generally to a communication system, an information processing device, an information processing method, and a computer program product.

BACKGROUND

As far as the communication partner authentication during data communication is concerned, the TLS (The Transport Layer Security Protocol, IETF RFC 8446) is widely used in the Internet. The TLS is meant for guaranteeing the safety of the communication path between communication nodes. For that reason, an application server that is not able to directly communicate with an edge device does not get to use the TLS, and hence cannot obtain or authenticate the edge data.

On the other hand, JWS (JSON Web Signature, IETF RFC 7515) and COSE (CBOR Object Signing and Encryption, IETF RFC 8152) enable issuing of digital signatures in data units according to the public-key encryption.

However, for example, from the perspective of the processing load, it is not desirable to digitally sign individual sets of edge data, such as to sign each set of sensor data. That is, in the conventional technology, it is a difficult task to verify, with only a small processing load, whether or not the edge data is generated by the expected edge device.

BRIEF DESCRIPTION OF THE DRAWINGS

FIG. 3 is a schematic diagram illustrating data configuration of first key management information;

FIG. 4A is a schematic diagram illustrating a data configuration of first communication data;

FIG. 4B is a schematic diagram illustrating a data configuration of the first communication data;

FIG. 4C is a schematic diagram illustrating a data configuration of second communication data;

FIG. 7 is a schematic diagram illustrating a data configuration of edge data management information;

DETAILED DESCRIPTION

Figure 1:
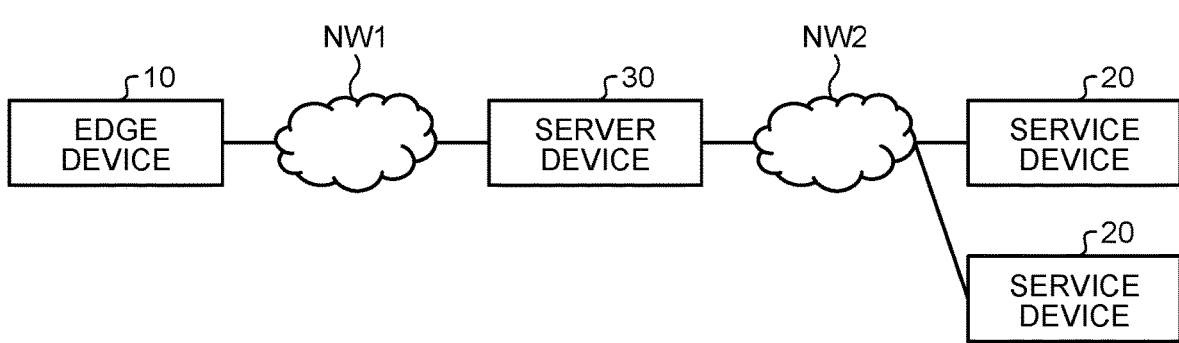
FIG. 1 is a schematic diagram illustrating a communication system.

A communication system according to an embodiment includes an edge device generating edge data and a service device making use of the edge data. The edge device is configured to generate a message authentication code by using a shared key shared with the service device. The edge device is configured to transmit first communication data representing communication data in which the message authentication code is assigned to the edge data. The service device is configured to verify source of generation of the edge data included in the first communication data. The verification is performed in accordance with verification result of verifying the message authentication code included in the first communication data by using a shared key shared with the edge device.

An exemplary embodiment of a communication system, an information processing device, an information processing method, and a computer program product will be explained below in detail with reference to the accompanying drawings.

In the following explanation of the embodiment, the portions referred to by the same reference numerals have practically identical functions, and the explanation regarding the identical portions is not repeatedly given.

FIG. 1 is a schematic diagram illustrating an example of a communication system 1 according to an embodiment.

The communication system 1 includes an edge device 10, a server device 30, and service devices 20.

The edge device 10 and the server device 30 are connected to each other by a first network NW1. The server device 30 and the service devices 20 are connected to each other by a second network NW2.

The edge device 10 is an information processing device that generates edge data. Regarding the edge data, the detailed explanation is given later. The edge device 10 establishes a connection with the first network NW1. In FIG. 1 is illustrated an example in which a single edge device 10 is connected to the first network NW1. However, there can be two or more edge devices 10 connected to the first network NW1.

The service devices 20 are information processing devices that make use of the edge data provided from the edge device 10. The service devices 20 establish a connection with the second network NW2. In FIG. 1 is illustrated an example in which two service devices 20 are connected to the second network NW2. However, there can be only one service device 20 connected to the second network NW2, or there can be three or more service devices 20 connected to the second network NW2.

The server device 30 is an information processing device meant for relaying the communication between the edge device 10 and the service devices 20. The server device 30 establishes a connection with the first network NW1 as well as with the second network NW2.

The first network NW1 and the second network NW2 represent examples of a network. The first network NW1 and the second network NW2 are local area networks, or field area networks, or wide area networks such as the Internet. The manner of connection with the first network NW1 and the second network NW2 can be a wired connection or a wireless connection.

The server device 30 and the service devices 20 can be implemented in, what is called, a cloud environment or can be implemented in an on-premises manner. Alternatively, the server device 30 and the service devices 20 can be implemented as virtual machines running in a virtual environment.

Given below is the explanation of an exemplary functional configuration of the edge device 10 according to the present embodiment.

Figure 2:
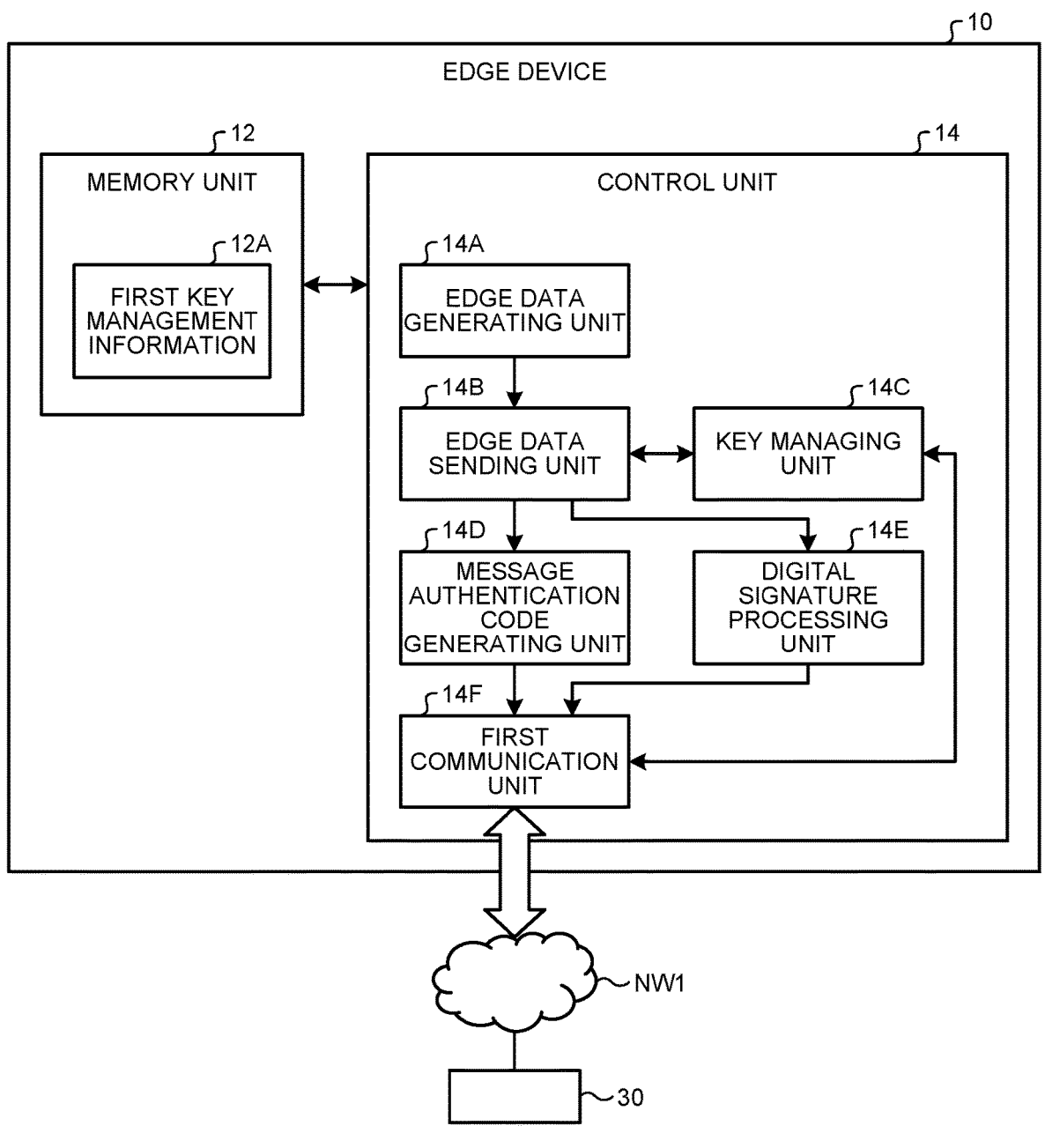
FIG. 2 is a schematic diagram illustrating a functional configuration of an edge device.

FIG. 2 is a schematic diagram illustrating an exemplary functional configuration of the edge device 10.

The edge device 10 includes a memory unit 12 and a control unit 14. The memory unit 12 and the control unit 14 are connected to each other in a manner of being able to transmit and receive data and signals.

The memory unit 12 is used to store a variety of data. In the present embodiment, the memory unit 12 is used to store first key management information 12A. Regarding the first key management information 12A, the detailed explanation is given later.

The control unit 14 includes an edge data generating unit 14A, an edge data sending unit 14B, a key managing unit 14C, a message authentication code generating unit 14D, a digital signature processing unit 14E, and a first communication unit 14F.

The edge data generating unit 14A, the edge data sending unit 14B, the key managing unit 14C, the message authentication code generating unit 14D, the digital signature processing unit 14E, and the first communication unit 14F are implemented by using, for example, one or more processors. For example, the constituent elements of the control unit 14 can be implemented by causing a central processing unit (CPU) to execute computer programs, that is, can be implemented by using software. Alternatively, the constituent elements can be implemented by using a dedicated IC, that is, can be implemented by using hardware. Still alternatively, the constituent elements can be implemented by using a combination of software and hardware. In the case of using a plurality of processors, each processor either can implement one of the constituent elements or can implement two or more constituent elements.

The edge data generating unit 14A generates edge data.

Herein, edge data represents the data that is to be provided to at least either the server device 30 or the service devices 20. Examples of the edge data include sensor data obtained from a sensor that is installed in the edge device 10; sensor data obtained from a sensor that is installed in some other device other than the edge device 10; and internal data of the edge device 10. The internal data of the edge device 10 represents information related to, for example, a memory, a storage, the files stored in the memory or the storage, and file setting information. More particularly, the internal data of the edge device 10 represents the memory usage. The storage in the edge device 10 is equivalent to, for example, the memory unit 12.

In the present embodiment, the explanation is given about an example in which the edge data generating unit 14A generates, as edge data, sensor data obtained from a sensor installed in the edge device 10 and internal data of the memory usage of the edge device 10.

Herein, a sensor need not be directly connected to an interface of the edge device 10, such as a general purpose input/output (GPIO), a universal asynchronous receiver/transmitter (UART), or an inter-integrated circuit (I2C). For example, the edge device 10 operates as an edge gateway, and obtains sensor data from a sensor via a network by a wireless connection or a wired connection. In the case of obtaining the sensor data by a wired connection, it is possible to use, for example, Ethernet (registered trademark), CAN (Controller Area Network), or BACnet (Building Automation and Control Networking protocol) as the communication method. In the case of obtaining the sensor data by a wireless connection, it is possible to use, for example, Wi-Fi (Wireless Fidelity), Bluetooth (registered trademark), or ZigBee (registered trademark) as the communication method.

As long as the edge data represents the data to be provided to at least either the server device 30 or the service devices 20, it is not limited to be the sensor data obtained from a sensor.

The edge data generating unit 14A makes use of: the sensor installed in the edge device 10, the memory or the storage of the edge device 10, the files stored in the storage and their setting information, and the information about other sensor devices with which communication is performed via a network; and generates edge data that includes at least some of the used information.

The edge data sensing unit 14B performs a transmission operation for sending the edge data generated by the edge data generating unit 14A. The edge data sending unit 14B makes an inquiry to the key managing unit 14C and, if the key managing unit 14C is holding a shared key that is shared with any service device 20, sends the target edge data for transmission to the message authentication code generating unit 14D.

The key managing unit 14C stores the first key management information 12A in advance and manages it. The first key management information 12A is used in managing the shared keys.

FIG. 3 is a schematic diagram illustrating an exemplary data configuration of the first key management information 12A.

In the first key management information 12A, communication partner identification information, shared key ID, shared key value, and validity are associated with each other. The "communication partner identification information" field represents identification information of the information processing device that represents the communication partner of the edge device 10. More particularly, the "communication partner identification information" field represents identification information of each of the service device 20 and the server device 30. The identification information of the service device 20 represents an example of service identification information.

The "shared key ID" field represents identification information of a shared key. Each shared key registered in the first key management information 12A is shared with one of the service devices 20 or the server device 30 identified by the communication partner identification information corresponding to the edge device 10. The "shared key value" field represents the value of a shared key. The "validity" field indicates the term of validity of a shared key. In the present embodiment, the explanation is given about an example in which each shared key is expressed by a shared key ID, a shared key value, and validity.

As illustrated in FIG. 3, the key managing unit 14C manages the first key management information 12A in which, for each communication partner with which a shared key is shared, the communication partner identification information, the shared key ID, the shared key value, and the validity are associated with each other. Meanwhile, in the first key management information 12A, relevant information about the shared keys can also be registered so as to be associated with the above-described fields.

Typically, a shared key ID is separately assigned for each communication partner. In the example illustrated in FIG. 3, the shared key identified by a shared key ID "100" is shared between the service device 20 corresponding to the communication partner identification information "service device A" and the server device 30 corresponding to the communication partner identification information "server device C". However, typically, since a shared key ID is separately assigned to each communication partner, a shared key value "AAAAAAAAAA" and a shared key value "CCCCCCCCC" are treated to be the shared key values of different shared keys.

In the present embodiment, the key managing unit 14C receives the shared keys generated by the service devices 20 and the server device 30, and manages the shared keys by registering them in the first key management information 12A.

A shared key that is received by the key managing unit 14C either from any service device 20 or from the server device 30 includes the information indicating the shared key ID and the validity as the relevant information about that shared key. Then, in the first key management information 12A, the key managing unit 14C registers the following information so as to be associated with each other: the shared key value of each received shared key; the shared key ID and the validity included as the corresponding relevant information; and the communication partner identification information identifying the information processing device that sent the concerned shared key.

Meanwhile, the key managing unit 14C can also set, in advance, the maximum validity for each received shared key.

Assume that a shared key is received in which the validity is set to be exceeding the preset maximum validity. In that case, the key managing unit 14C can change the validity to be within the maximum validity and then register the shared key in the first key management information 12A. Alternatively, in that case, the key managing unit 14C can destroy the received shared key without registering it in the first key management information 12A.

Moreover, assume that the key managing unit 14C receives a new shared key that includes, as the relevant information, a shared key ID that is already registered in the first key management information 12A. In that case, the key managing unit 14C can overwrite, in the first key management information 12A, the new shared key and the relevant information of that shared key so as to be associated with the already-registered shared key ID. Additionally, in that case, the key managing unit 14C can destroy the received shared key without registering it in the first key management information 12A.

The following explanation is given with reference to FIG. 2.

When edge data is received from the edge data sending unit 14B, the message authentication code generating unit 14D generates a message authentication code by using the shared key that is shared with the concerned service device 20.

For example, the message authentication code generating unit 14D can generate a message authentication code according to HMAC (Hash-based Message Authentication code) or CMAC (Cipher-based Message Authentication Code). However, as long as the message authentication code generating unit 14D generates a message authentication code by using a shared key, the generation method is not limited to the methods mentioned above.

In the present embodiment, the message authentication code generating unit 14D uses each of one or more shared keys registered in the first key management information 12A to generate a message authentication code for the service device 20 that is identified by the service identification information corresponding to the concerned shared key.

More specifically, when the shared keys that are shared with the service devices 20 are registered in the first key management information 12A, the message authentication code generating unit 14D generates a message authentication code by using each shared key registered in the first key management information 12A. On the other hand, if the shared keys that are shared with the service devices 20 are not registered in the first key management information 12A, then the message authentication code generating unit 14D does not generate message authentication codes.

The key managing unit 14C refers to the first key management information 12A and manages a shared key for each communication partner (see FIG. 3). Hence, when the shared keys for a plurality of communication partners are registered in the first key management information 12A, the message authentication code generating unit 14D can use each of those shared keys registered in the first key management information 12A and generate a message authentication code for the corresponding communication partner.

That is, as illustrated in FIG. 3, the shared key corresponding to the identification information of the server device 30 can be registered in the first key management information 12A. In other words, the edge device 10 can share a shared key with the server device 30. In that case, the message authentication code generating unit 14D can also generate a message authentication code for the server device 30 by using the shared key corresponding to the identification information of the server device as specified in the "communication partner identification information" field of the first key management information 12A.

When the edge data generated by the edge data generating unit 14A satisfies a predetermined condition, the edge data sending unit 14B sends an edge data group, which is the group of one or more sets of edge data satisfying that condition, to the digital signature processing unit 14E.

Herein, the condition can be set in advance. Examples of the condition include a condition indicating that the data volume of the edge data is equal to or greater than a first data volume, and a condition indicating that the holding period of the edge data is equal to or greater than a first time period. Thus, the first data volume and the first time period can be set in advance. The first data volume can be set to exceed the expected data volume of a single set of edge data, or to exceed the expected average data volume of the edge data, or to exceed the expected maximum data volume of the edge data. The first time period can be set to exceed the period of time required to hold a data volume exceeding the expected data volume of a single set of edge data, or exceeding the expected average data volume of the edge data, or exceeding the expected maximum data volume of the edge data. Within the range in which the abovementioned constraints are met, the first data volume and the first time period can be kept variable according to an operation instruction given by the user.

Thus, the edge data sending unit 14B does not immediately send the edge data that has been generated by the edge data generating unit 14A. That is, until the data volume of the edge data generated by the edge data generating unit 14A reaches the first data volume or until the holding period of the edge data becomes equal to or greater than the first time period, the edge data sending unit 14B holds the edge data. Subsequently, once the data volume of the edge data group, which is the group of sets of edge data that is held, becomes equal to or greater than the first data volume or once the holding period of the edge data group becomes equal to or greater than the first time period, the edge data sending unit 14B sends the edge data group to the digital signature processing unit 14E.

Meanwhile, the abovementioned condition is assumed to be kept variable according to an operation instruction given by the user regarding the edge device 10 or according to the communication performed with the server device 30.

When the edge data satisfies the predetermined condition, the digital signature processing unit 14E issues a digital signature to the edge data group, which is the group of one or more sets of edge data satisfying the condition, by using a private key of the edge device 10.

Thus, when an edge data group is received from the edge data sending unit 14B, the digital signature processing unit 14E can issue a digital signature to the received edge data group by using a private key. Meanwhile, until the data volume of the edge data generated by the edge data generating unit 14A reaches the first data volume or until the holding period of the edge data becomes equal to or greater than the first time period, the digital signature processing unit 14E can keep holding the edge data. Subsequently, once the data volume of the edge data group, which is the group of sets of edge data that is held, becomes equal to or greater than the first data volume or once the holding period of the edge data group becomes equal to or greater than the first time period, the digital signature processing unit 14E can issue a digital signature by using a private key.

The private key to be used in a digital signature can be stored in advance in the edge data sending unit 14B, or in the digital signature processing unit 14E, or in the memory unit 12. Regarding the memory unit 12 representing the storage for the private key and regarding the mechanism of the memory unit 12, it is possible to use a known mechanism.

When a message authentication code is generated by the message authentication code generating unit 14D, the first communication unit 14F sends first communication data that represents the communication data in which the message authentication code is assigned to the edge data. Moreover, when a digital signature is issued by the digital signature processing unit 14E, the first communication unit 14F sends second communication data that represents the edge data to which a digital signature has been issued.

Thus, the first communication unit 14F sends at least either the first communication data or the second communication data as the communication data to the server device 30.

The first communication data and the second communication data represent examples of the communication data. The first communication data represents the edge data having a message authentication code assigned thereto. The second communication data represents the edge data group having a digital signature issued thereto.

FIGS. 4A to 4C are schematic diagrams illustrating exemplary data configurations of communication data 40.

FIG. 4A is a schematic diagram illustrating an exemplary data configuration of first communication data 40A. For example, the first communication data 40A represents the communication data 40 in which a plurality of message authentication codes is assigned to a single set of edge data.

More particularly, for example, the first communication data 40A includes a message authentication code that is meant for the service device 20 having the service identification information "service device A" and that is assigned to the edge data, and includes a message authentication code that is meant for the service device 20 having the service identification information "service device B" and that is assigned to the edge data. The service identification information "service device A" and the service identification information "service device B" represent the sets of service identification information of such service devices 20 for which shared keys are registered in the first key management information 12A.

FIG. 4B is a schematic diagram illustrating another exemplary data configuration of the first communication data 40A. For example, the first communication data 40A represents the communication data 40 in which a single message authentication code is assigned to a single set of edge data.

More particularly, for example, the first communication unit 14F sends first communication data 40A1 and first communication data 40A2 as the first communication data 40A.

The first communication data 40A1 includes a single set of edge data and a message authentication code that is meant for the service device 20 having the service identification information "service device A" and that is assigned to the edge data. The first communication data 40A2 includes a single set of edge data and a message authentication code that is meant for the service device 20 having the service identification information "service device B" and that is assigned to the edge data.

In this way, the first communication data 40A either can represent the communication data 40 in which a message authentication code meant for each of a plurality of communication partners is assigned to a single set of edge data, or can represent the communication data 40 in which a message authentication code meant for a single communication partner is assigned to a single set of edge data.

FIG. 4C is a schematic diagram illustrating an exemplary data configuration of second communication data 40B. The second communication data 40B represents the communication data 40 in which a digital signature is issued to an edge data group made of a plurality of sets of edge data.

Returning to the explanation with reference to FIG. 2, the first communication unit 14F of the edge device 10 sends the communication data 40, which includes at least either the first communication data 40A or the second communication data 40B, to the server device 30 via the first network NW1.

Meanwhile, there are times when no shared keys are registered in the first key management information 12A. That is, there are times when the edge device 10 neither shares a valid shared key with the server device 30 nor shares a valid shared key with any service device 20. In that case, without generating and assigning any message identification code and without issuing any digital signature, the control unit 14 of the edge device 10 can send the edge data as the communication data 40 to the server device 30.

Given below is the explanation of an exemplary functional configuration of the server device 30.

Figures 5, 6:
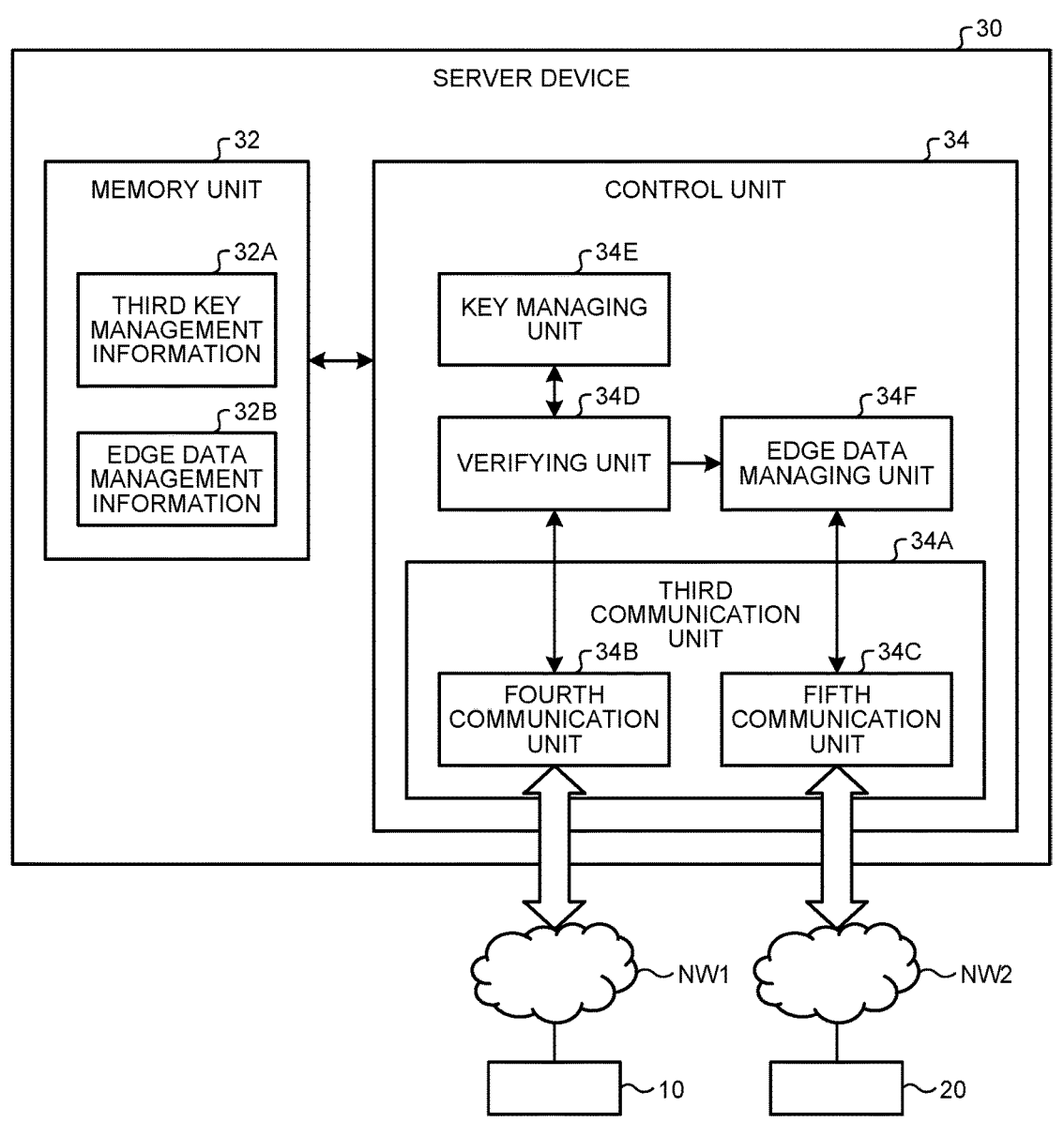
FIG. 5 is a schematic diagram illustrating a functional configuration of a server device.
FIG. 6 is a schematic diagram illustrating a data configuration of third key management information.

FIG. 5 is a schematic diagram illustrating an exemplary functional configuration of the server device 30.

The server device 30 includes a memory unit 32 and a control unit 34. The memory unit 32 and the control unit 34 are connected to each other in a manner of being able to send and receive data and signals.

The memory unit 32 is used to store a variety of data. In the present embodiment, the memory unit 32 is used to store third key management information 32A and edge data management information 32B. Regarding the third key management information 32A and the edge data management information 32B, the detailed explanation is given later.

The control unit 34 includes a third communication unit 34A, a verifying unit 34D, a key managing unit 34E, and an edge data managing unit 34F. The third communication unit 34A further includes a fourth communication unit 34B and a fifth communication unit 34C. The third communication unit 34A, the fourth communication unit 34B, the fifth communication unit 34C, the verifying unit 34D, the key managing unit 34E, and the edge data managing unit 34F are implemented by using, for example, one or more processors.

The third communication unit 34A sends the communication data 40, which is received from the edge device 10, to the service devices 20.

The third communication unit 34A includes the fourth communication unit 34B and the fifth communication unit 34C.

The fourth communication unit 34B communicates with the edge device 10 via the first network NW1. Thus, the fourth communication unit 34B receives the communication data 40 from the edge device 10. Moreover, the fourth communication unit 34B sends, to the edge device 10, the shared keys that are shared by the server device 30 and the service devices 20. The fourth communication unit 34B of the server device 30 and the first communication unit 14F of the edge device 10 send and receive data by using a communication protocol such as HTTP (HyperText Transfer Protocol) or MQTT (Message Queueing Telemetry Transport). Moreover, the transmission and the reception of data can be protected by using TLS (Transport Layer Security) or IPsec (Security Architecture for Internet Protocol).

The key managing unit 34E stores the third key management information 32A in advance and manages it. The third key management information 32A is used in managing shared keys.

FIG. 6 is a schematic diagram illustrating an exemplary data configuration of the third key management information 32A.

In the third key management information 32A, similar to the first key management information 12A, the following fields are associated with each other: communication partner identification information; shared key ID; shared key value; and validity. Regarding the communication partner identification information, the shared key ID, the shared key value, and the validity; the detailed explanation has been given earlier. Hence, the explanation is not repeated. According to the present embodiment, in the third key management information 32A, the shared key that is shared with the edge device 10 is registered.

The following explanation is given with reference to FIG. 5.

For example, the key managing unit 34E can generate a shared key that is to be shared with the edge device 10, and can send it to the edge device 10 in advance.

More particularly, for example, the key managing unit 34E generates a shared key that is to be shared with the edge device 10. At the time of generating a shared key, the key managing unit 34E sets the shared key value representing the value of the shared key as well as sets the shared key ID and the validity. That is, the key managing unit 34E generates the third key management information 32A. The key managing unit 34E encrypts that shared key by using the public key of the edge device 10, and sends the post-encryption shared key to the edge device 10. The post-encryption shared key that is sent to the edge device 10 can be decrypted only by using the private key of the edge device 10. Hence, the shared key gets safely shared between the server device 30 and the edge device 10.

Meanwhile, in the edge device 10 and the server device 30, the shared key to be shared between them can be set in advance by a manual operation of the user. Alternatively, the edge device 10 and the server device 30 can share the shared key by using some other communication means. Still alternatively, the edge device 10 and the server device 30 can share the shared key according to some other method other than the method explained above.

The fourth communication unit 34B sends the communication data, which is received from the edge device 10, to the verifying unit 34D.

The verifying unit 34D verifies the communication data that is received by the fourth communication unit 34B from the edge device 10. More specifically, firstly, the verifying unit 34D determines whether or not the received communication data 40 represents the first communication data 40A or the second communication data 40B.

If the communication data 40 received from the edge device 10 represents the second communication data 40B, then the verifying unit 34D verifies the second communication data 40B by using the public key of the edge device 10. Herein, it is assumed that the key managing unit 34E manages, in advance, the public key of the edge device 10.

That is, in accordance with the verification result of verifying the digital signature issued to the edge data group, which is included in the second communication data 40B, by using the public key of the edge device 10; the verifying unit 34D verifies the source of generation of the edge data group included in the second communication data 40B.

More specifically, by using the public key used in the verification, the verifying unit 34D verifies whether or not the edge data group included in the communication data 40 was generated by the edge device 10 corresponding to the concerned public key. If the verification is successful, then the verifying unit 34D verifies that the edge device 10 corresponding to the public key used in the verification is the source of generation of the edge data group included in the communication data 40. On the other hand, if the verification is not successful, then the verifying unit 34D verifies that the edge device 10 corresponding to the public key used in the verification is not the source of generation of the edge data group included in the communication data 40.

Assume that the first communication data 40A represents the communication data received from the edge device 10 and that the message authentication code included in the first communication data 40A is generated by using the shared key of the server device 30. In that case, the verifying unit 34D identifies, from the third key management information 32A, the shared key corresponding to the communication partner identification information of the edge device 10. Then, the verifying unit 34D verifies the first communication data 40A by using the identified shared key. If the verification is successful, then the verifying unit 34D verifies that the edge device 10 corresponding to the shared key used in the verification is the source of generation of the edge data included in the communication data 40. On the other hand, if the verification is not successful, then the verifying unit 34D verifies that the edge device corresponding to the shared key used in the verification is not the source of generation of the edge data included in the communication data 40.

If the verification is successful, then the verifying unit 34D sends the communication data 40, which was involved in the verification, to the edge data managing unit 34F.

Assume that the first communication data 40A represents the communication data received from the edge device 10 and that the message authentication code included in the first communication data 40A is generated by using the shared key of a particular service device 20. In that case, the verifying unit 34D skips the verification, and sends the first communication data 40A to the edge data managing unit 34F without verification.

The edge data managing unit 34F manages the communication data 40 received from the edge device 10. That is, the edge data managing unit 34F manages the edge data that is included in the communication data 40 received from the edge device 10.

In the present embodiment, the edge data managing unit 34F registers the communication data 40, which is received from the edge device 10, in the edge data management information 32B.

FIG. 7 is a schematic diagram illustrating an exemplary data configuration of the edge data management information 32B.

In the edge data management information 32B, the following fields are associated with each other: generation timing; reception timing; edge data; generation source verification completed; message authentication code; and digital signature.

The "generation timing" field represents the timing of generation of the edge data that is included in the communication data 40. The "reception timing" field represents the timing of reception of the communication data 40 by the server device 30. The "generation source verification completed" field represents the information indicating whether or not the verifying unit 34D has already verified the communication data 40. The "message authentication code" field represents the message authentication code assigned to the edge data that is included in the communication data 40. The "digital signature" field represents the digital signature issued to the edge data that is included in the communication data 40.

When the verification performed by the verifying unit 34D is successful, the edge data managing unit 34F can register, in the "generation source verification completed" field, the information indicating that the source of generation is already verified. On the other hand, when the verification performed by the verifying unit 34D is not successful, the edge data managing unit 34F can register, in the "generation source verification completed" field, the information indicating that either the source of generation was not subjected to verification or the verification was not successful.

The edge data managing unit 34F can generate and manage the edge data management information 32B, which is illustrated in FIG. 7, for each edge device 10. Moreover, in the edge data management information 32B, in accordance with the verification result, the identification information of the edge device 10 that represents the source of generation of the edge data can also be registered so as to be associated with the fields of the edge data management information 32B. The identification information of the edge device 10 is equivalent to edge identification information.

The following explanation is given with reference to FIG. 5.

In response to a request from any service device 20, the edge data managing unit 34F provides the communication data 40, which includes edge data, to that service device 20. The edge data managing unit 34F sends the communication data 40 to the concerned service device 20 via the fifth communication unit 34C.

More specifically, when a data acquisition request is received from any service device 20, the edge data managing unit 34F sends, to that service device 20, the communication data 40 which includes the edge data requested by the data acquisition request.

More particularly, consider a case in which the communication data 40 that includes the edge data requested by a data acquisition request has a message authentication code assigned thereto. In that case, the edge data managing unit 34F sends the first communication data 40A, which includes the message authentication code and the edge data, to the service device 20.

Moreover, consider a case in which the communication data 40 that includes the edge data requested by a data acquisition request does not have a message authentication code assigned thereto and in which the edge data group included in the communication data 40 has a digital signature issued thereto. In that case, the edge data managing unit 34F sends the second communication data 40B representing the communication data 40 to the service device 20. That is, the edge data managing unit 34F sends, to the service device 20, the second communication data 40B that includes the edge data group including the requested edge data and that includes the digital signature issued to the edge data group.

Furthermore, consider a case in which the communication data 40 that includes the edge data requested by a data acquisition request does not have a message authentication code assigned thereto and in which the edge data group included in the communication data 40 does not have a digital signature issued thereto. In that case, the edge data managing unit 34F can destroy the communication data 40. Alternatively, the edge data managing unit 34F can send, to the service device 20, the communication data including the edge data which neither has a message authentication code assigned thereto nor has a digital signature issued thereto.

Meanwhile, in response to a data acquisition request, the edge data managing unit 34F can send only the communication data 40, which includes the already-verified edge data verified by the server device 30, to the service device 20. Alternatively, regardless of whether or not the edge data has been verified by the server device 30, the edge data managing unit 34F can send the communication data 40 to the service device 20. The already-verified edge data implies the edge data for which information indicating successful verification or unsuccessful verification is registered in the "generation source verification completed" field.

Moreover, in response to a data acquisition request, the edge data managing unit 34F can send, to the service device 20, the communication data 40 that includes the edge data having at least either a message authentication code or a digital signature assigned thereto. For example, consider a case in which, regarding the edge data that has the generation timing of "04/15/2022 10:00" specified in the edge data management information 32B illustrated in FIG. 7, a particular service device 20 sends a data acquisition request to the server device 30 for data having a message authentication code assigned thereto. In that case, the edge data managing unit 34F of the server device 30 can send, to the service device 20, the first communication data 40A assigned with a message authentication code corresponding to the edge data that corresponds to the generation timing of "04/15/2022 10:00" specified in the edge data management information 32B.

Furthermore, as the communication data 40 that includes the edge data requested by a data acquisition request, the edge data managing unit 34F can send, to the service device 20, the communication data 40 that further includes information indicating the corresponding reception timing specified in the edge data management information 32B.

Meanwhile, the "reception timing" field may or may not be included in the edge data management information 32B. When the "reception timing" field is included in the edge data management information 32B, it becomes possible for the server device to manage the fact that the edge data corresponding to the timing specified in the "reception timing" field was certainly present.

The fifth communication unit 34C communicates with the service devices 20 via the second network NW2. The fifth communication unit 34C and the service devices 20 send and receive data by using a communication protocol such as HTTP or MQTT. Moreover, the transmission and the reception of data can be protected by TLS or IPsec.

The fifth communication unit 34C sends the communication data 40, which is provided by the edge data managing unit 34F and which is addressed to a particular service device 20, to the concerned service device 20 via the second network NW2. More specifically, the fifth communication unit 34C receives the communication data which is addressed to a particular service device 20, from the edge data managing unit 34F and sends it to the service device 20.

Given below is the explanation of an exemplary functional configuration of the service device 20.

Figures 8, 9:
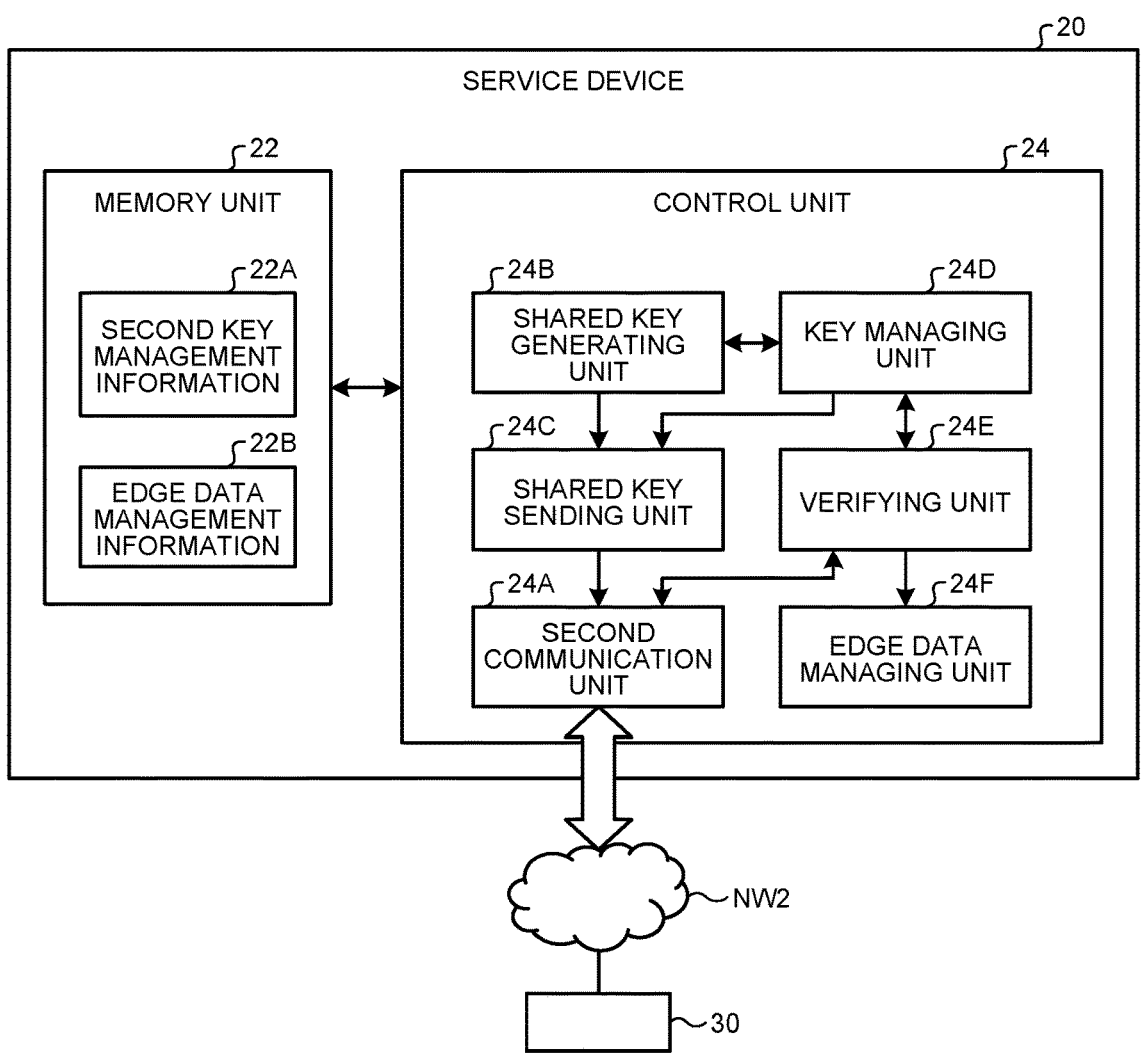
FIG. 8 is a schematic diagram illustrating a functional configuration of a service device.
FIG. 9 is a schematic diagram illustrating a data configuration of second key management information.

FIG. 8 is a schematic diagram illustrating an exemplary functional configuration of the service device 20.

The service device 20 includes a memory unit 22 and a control unit 24. The memory unit 22 and the control unit 24 are connected to each other in a manner of being able to send and receive data and signals.

The memory unit 22 is used to store a variety of data. In the present embodiment, the memory unit 22 is used to store second key management information 22A and edge data management information 22B. Regarding the second key management information 22A and the edge data management information 22B, the detailed explanation is given later.

The control unit 24 includes a second communication unit 24A, a shared key generating unit 24B, a shared key sending unit 24C, a key managing unit 24D, a verifying unit 24E, and an edge data managing unit 24F. The second communication unit 24A, the shared key generating unit 24B, the shared key sending unit 24C, the key managing unit 24D, the verifying unit 24E, and the edge data managing unit 24F are implemented by using, for example, one or more processors.

The second communication unit 24A communicates with the server device 30 via the second network NW2. For example, the second communication unit 24A sends a shared key, which is shared with the edge device 10, to the server device 30. Moreover, the second communication unit 24A receives the communication data 40 from the server device 30. Meanwhile, the second communication unit 24A can directly communicate with the edge device 10 via the server device 30, and can share the shared key.

The shared key generating unit 24B generates a shared key that is to be shared with the edge device 10. At the time of generating a shared key, the shared key generating unit 24B sets the shared key value representing the value of the shared key as well as sets the shared key ID and the validity.

That is, the shared key generating unit 24B generates the second key management information 22A.

FIG. 9 is a schematic diagram illustrating an exemplary data configuration of the second key management information 22A. In the second key management information 22A, the following fields are associated with each other: communication partner identification information; shared key ID; shared key value; and validity.

The key managing unit 24D manages the shared keys generated by the shared key generating unit 24B. That is, the key managing unit 24D stores the second key management information 22A, in which the shared keys generated by the shared key generating unit 24B are registered, in the memory unit 22 and manages the second key management information 22A. Herein, the key managing unit 24D manages a shared key for each communication partner. With respect to the service device 20, the edge device 10 represents the communication partner. Hence, in the second key management information 22A, the device identification information representing the identification information of the edge device 10 is registered in the "communication partner identification information" field. Moreover, the key managing unit 24D registers the public key of the edge device 10 in advance, and manages the public key.

The shared key sending unit 24C encrypts the shared key, which is generated by the shared key generating unit 24B, by using the public key of the edge device 10; and sends the post-encryption shared key to the server device 30. Then, the third communication unit 34A of the server device 30 sends the post-encryption shared key, which is received from the service device 20, to the edge device 10. The transmission of the post-encryption shared key by the shared key sending unit 24C to the edge device 10 can be performed either according to the push-type communication to the edge device 10 or according to the pull-type communication from the edge device 10.

The post-encryption shared key that is sent to the edge device 10 can be decrypted only by using the private key of the edge device 10. Hence, the shared key gets safely shared between the service device 20 and the edge device 10.

Moreover, the shared key sending unit 24C can also issue a signature as may be necessary, so as to protect the shared key, which is shared with the edge device 10, by using the private key of the service device 20. Meanwhile, in the edge device 10 and the service device 20, the shared key to be shared between them can be set in advance by a manual operation of the user. Alternatively, the edge device 10 and the service device 20 can share the shared key by using some other communication means. Still alternatively, the edge device 10 and the service device 20 can share the shared key according to some other method other than the method explained above.

The second communication unit 24A sends a data acquisition request to the server device 30 according to an operation instruction issued by the user from an operating unit. The data acquisition request includes the identification information of the requested edge data.

In response to the data acquisition request, the second communication unit 24A receives the communication data 40 from the server device 30. Then, the second communication unit 24A sends the communication data 40, which is received from the server device 30, to the verifying unit 24E.

The verifying unit 24E verifies the communication data 40 that is received by the second communication unit 24A from the server device 30. More specifically, firstly, the verifying unit 24E determines whether the received communication data 40 represents the first communication data 40A or the second communication data 40B.

Consider a case in which the communication data 40 received from the server device 30 represents the edge data having a message authentication code assigned thereto, that is, represents the first communication data 40A. In that case, in accordance with the verification result of verifying the message authentication code, which is included in the first communication data 40A, by using the shared key that is shared with the edge device 10, the verifying unit 24E verifies the source of generation of the edge data included in the first communication data 40A.

That is, by using the shared key used in the verification, the verifying unit 24E verifies whether or not the edge data included in the communication data 40 received from the server device 30 is generated by the edge device 10 corresponding to the shared key. If the verification is successful, the verifying unit 24E verifies that the edge device 10 corresponding to the shared key used in the verification is the source of generation of the edge data included in the communication data 40. On the other hand, if the verification is not successful, then the verifying unit 24E verifies that the edge device 10 corresponding to the shared key used in the verification is not the source of generation of the edge data included in the communication data 40.

On the other hand, consider a case in which the communication data 40 received from the server device 30 represents an edge data group having a digital signature issued thereto, that is, represents the second communication data 40B. In that case, the verifying unit 24E verifies the second communication data 40B by using the public key of the edge device 10.

That is, in accordance with the verification result of verifying the digital signature issued to the edge data group, which is included in the second communication data 40B, by using the public key of the edge device 10, the verifying unit 24E verifies the source of generation of the edge data group included in the second communication data 40B.

More specifically, by using the public key used in the verification, the verifying unit 24E verifies whether or not the edge data group included in the communication data 40 was generated by the edge device 10 corresponding to the concerned public key. If the verification is successful, then the verifying unit 24E verifies that the edge device 10 corresponding to the public key used in the verification is the source of generation of the edge data group included in the communication data 40. On the other hand, if the verification is not successful, then the verifying unit 24E verifies that the edge device 10 corresponding to the public key used in the verification is not the source of generation of the edge data group included in the communication data 40.

Then, the verifying unit 24E sends the communication data 40, which was involved in the verification, and the verification result to the edge data managing unit 24F.

The edge data managing unit 24F manages the communication data 40 that is received from the server device 30. That is, the edge data managing unit 24F manages the edge data that is included in the communication data received from the server device 30.

In the present embodiment, the edge data managing unit 24F registers the communication data 40, which is received from the server device 30, in the edge data management information 22B. The data configuration of the edge data management information 22B is identical to the data configuration of the edge data management information 32B (see FIG. 7).

The edge data managing unit 24F can register, in the edge data management information 22B, only such communication data 40 for which the verification performed by the verifying unit 24E was successful. At that time, in the "generation source verification completed" field in the edge data management information 22B, the edge data managing unit 24F can register the information indicating that the source of generation has been already verified. Moreover, regarding the communication data 40 for which the verification was not successful, the edge data managing unit 24F or the verifying unit 24E can destroy such communication data 40.

Alternatively, the edge data managing unit 24F can register, in the edge data management information 22B, such communication data 40 for which the verification performed by the verifying unit 24E was not successful. In that case, in the "already-verified source generation" field in the edge data management information 22B, the edge data managing unit 24F can register the information indicating that either the source of generation was not subjected to verification or the verification was not successful.

Given below is the explanation of an exemplary flow of the information processing performed in the communication system 1 according to the present embodiment.

Figure 10:
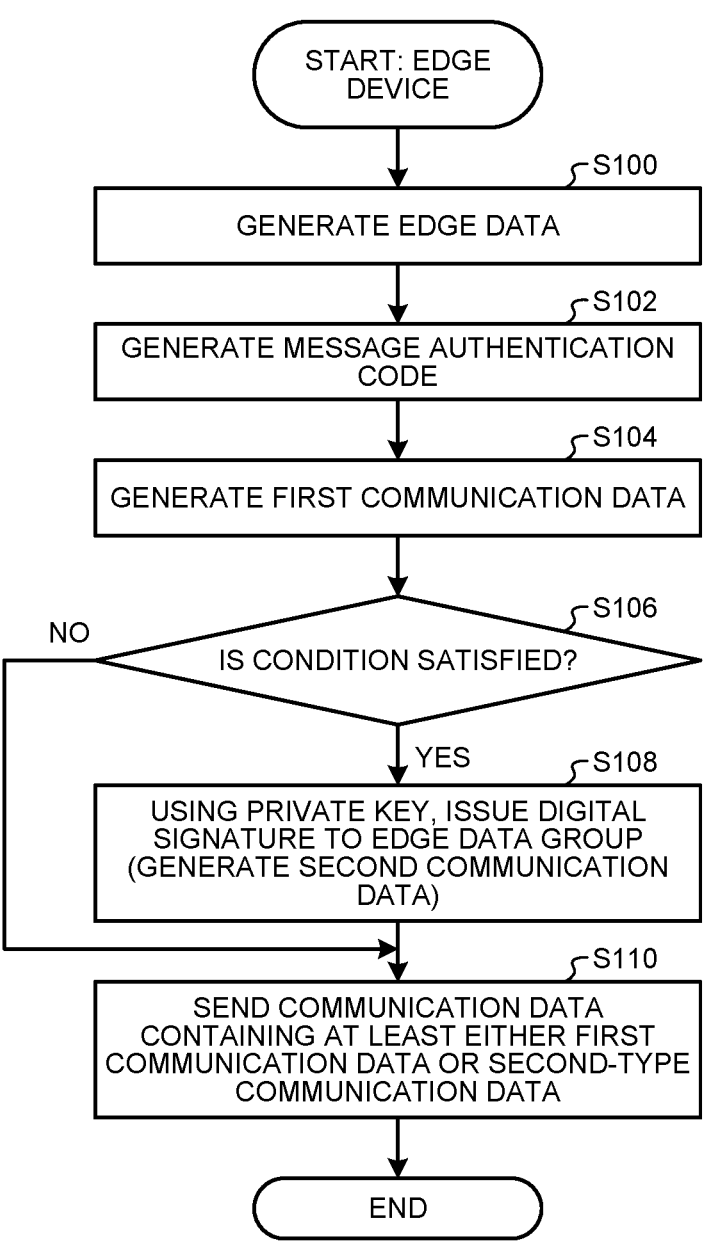
FIG. 10 is a flowchart for explaining a flow of the information processing performed by the edge device.

FIG. 10 is a flowchart for explaining an exemplary flow of the information processing performed by the edge device 10 according to the present embodiment.

With reference to FIG. 10, the explanation is given about the case in which a shared key that is shared between the edge device 10 and each service device 20 is registered in the first key management information 12A.

The edge data generating unit 14A of the edge device 10 generates edge data (Step S100).

With respect to the edge data generated at Step S100, the message authentication code generating unit 14D uses the shared keys registered in the first key management information 12A to generate a message authentication code for each communication destination (Step S102). Then, the message authentication code generating unit 14D generates the first communication data 40A in which the message authentication code generated at Step S102 is assigned to the edge data generated at Step S100 (Step S104).

The edge data sending unit 14B determines whether or not the edge data generated at Step S100 satisfies a predetermined condition (Step S106). For example, the edge data sending unit 14B determines whether or not the data volume of the edge data generated at Step S100 is equal to or greater than the first data volume or determines whether or not the holding period of the edge data group, which includes the edge data generated at Step S100, is equal to or greater than the first time period. As the holding period for the edge data group that includes the edge data generated at Step S100, it is possible to use the holding period of such a set of edge data which is held for the maximum length of time from among a plurality of sets of edge data included in the edge data group.

If the determination at Step S106 is negative (No at Step S106), then the system control proceeds to Step S110. On the other hand, if the determination at Step S106 is affirmative (Yes at Step S106), then the system control proceeds to Step S108.

At Step S108, the digital signature processing unit 14E issues a digital signature to the edge data group, which is the group of sets of edge data satisfying the condition, by using the private key of the edge device 10 (Step S108). As a result of performing the operation Step S108, the digital signature processing unit 14E generates the second communication data 40B.

The first communication unit 14F sends, to the server device 30, the communication data 40 that includes at least either the first communication data 40A generated at Step S104 or the second communication data 40B generated at Step S108 (Step S110). That marks the end of the present routine.

Figure 11:
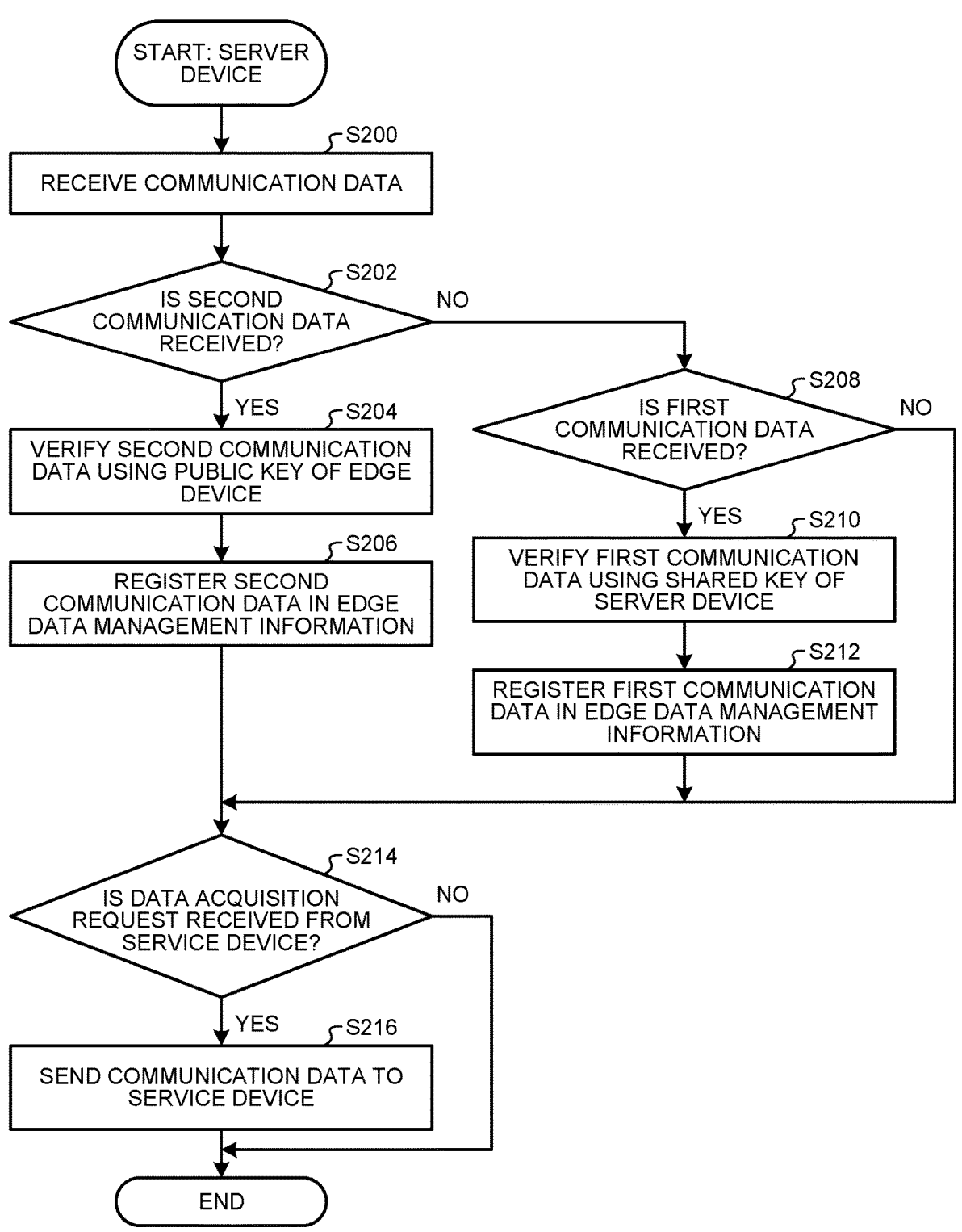
FIG. 11 is a flowchart for explaining a flow of the information processing performed by the server device.

FIG. 11 is a flowchart for explaining an exemplary flow of the information processing performed by the server device 30.

With reference to FIG. 11, the explanation is given about a case in which the shared key that is shared between the edge device 10 and the server device 30 is registered in the first key management information 12A of the edge device 10 and in the third key management information 32A of the server device 30.

The fourth communication unit 34B receives the communication data 40 from the edge device 10 (Step S200).

The verifying unit 34D determines whether or not the communication data 40 received at Step S200 represents the second communication data 40B (Step S202). If the communication data 40 represents the second communication data 40B (Yes at Step S202), then the system control proceeds to Step S204.

At Step S204, the verifying unit 34D verifies the second communication data 40B by using the public key of the edge device 10 (Step S204). Herein, by using the public key involved in the verification, the verifying unit 34D verifies whether or not the edge data group included in the second communication data 40B was generated by the edge device 10 corresponding to the concerned public key. If the verification is successful, then the verifying unit 34D verifies that the edge device 10 corresponding to the public key used in the verification is the source of generation of the edge data group included in the second communication data 40B. On the other hand, if the verification is not successful, then the verifying unit 34D verifies that the edge device 10 corresponding to the public key used in the verification is not the source of generation of the edge data group included in the second communication data 40B.

The edge data managing unit 34F registers the communication data 40 received at Step S200 and the verification result obtained at Step S204 so as to be associated with each other in the edge data management information 32B (Step S206). Then, the system control proceeds to Step S214.

Meanwhile, if the determination at Step S202 is negative (No at Step S202), then the system control proceeds to Step S208. At Step S208, the verifying unit 34D determines whether or not the communication data 40 received at Step S200 represents the first communication data 40A (Step S208). More specifically, the verifying unit 34D determines whether or not the communication data 40 received at Step S200 represents the first communication data 40A, and determines whether or not the message authentication code included in the first communication data 40A is generated by using the shared key that is shared with the server device 30.

If the determination at Step S208 is affirmative (Yes at Step S208), then the system control proceeds to Step S210.

At Step S210, the verifying unit 34D verifies the first communication data which represents the communication data received at Step S200, by using the shared key registered in the third key management information 32A (Step S210). That is, by using the shared key that is shared between the edge device 10 and the server device 30, the verifying unit 34D verifies the edge data included in the first communication data 40A. If the verification is successful, then the verifying unit 34D verifies that the edge device 10 corresponding to the shared key used in the verification is the source of generation of the edge data group included in the first communication data 40A. On the other hand, if the verification is not successful, then the verifying unit 34D verifies that the edge device 10 corresponding to the shared key used in the verification is not the source of generation of the edge data group included in the first communication data 40A.

The edge data managing unit 34F registers the communication data 40 received at Step S200 and the verification result obtained at Step S210 so as to be associated with each other in the edge data management information 32B (Step S212). Then, the system control proceeds to Step S214.

Meanwhile, if the determination at Step S208 is negative (No at Step S208), then the verifying unit 34D skips the verification. Subsequently, the verifying unit 34D sends the communication data 40, which is not subjected to verification, to the edge data managing unit 34F. Then, the system control proceeds to Step S214.

At Step S214, the edge data managing unit 34F determines whether or not a data acquisition request is received from the service device 20 (Step S214). If the determination at Step S214 is negative (No at Step S214), then the present routine is ended. On the other hand, if the determination at Step S214 is affirmative (Yes at Step S214), then the system control proceeds to Step S216.

At Step S216, in response to the data acquisition request received at Step S214, the edge data managing unit 34F sends the communication data 40 to the concerned service device 20 via the fifth communication unit 34C (Step S216). That marks the end of the present routine.

Figure 12:
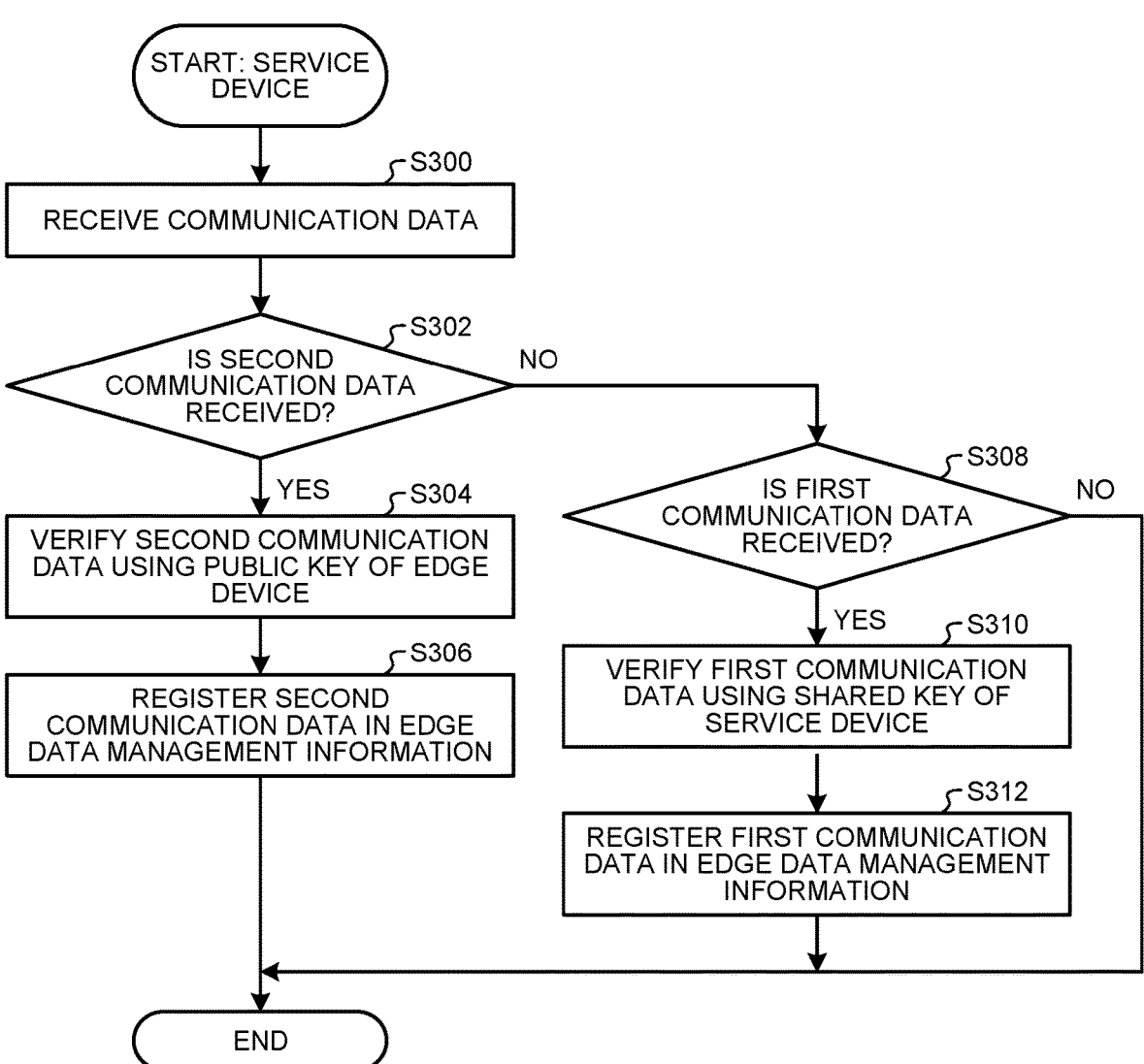
FIG. 12 is a flowchart for explaining a flow of the information processing performed by the service device.

FIG. 12 is a flowchart for explaining an exemplary flow of the information processing performed by the service device 20.

With reference to FIG. 12, the explanation is given about a case in which the shared key that is shared between the edge device 10 and the concerned service device is registered in the first key management information 12A of the edge device 10 and in the second key management information 22A of the service device 20.

The second communication unit 24A receives the communication data 40 from the server device 30 (Step S300).

The verifying unit 24E determines whether or not the communication data 40 received at Step S300 represents the edge data group to which a digital signature is issued, that is, represents the second communication data 40B (Step S302). If the communication data 40 represents the second communication data 40B (Yes at Step S302), then the system control proceeds to Step S304.

At Step S304, the verifying unit 24E verifies the second communication data by using the public key of the edge device 10 (Step S304). Thus, by using the public key involved in the verification, the verifying unit 24E verifies whether or not the edge data group included in the second communication data 40B is generated by the edge device 10 corresponding to that public key. If the verification is successful, then the verifying unit 34D verifies that the edge device 10 corresponding to the public key used in the verification is the source of generation of the edge data group included in the communication data 40. On the other hand, if the verification is not successful, then the verifying unit 24E verifies that the edge device 10 corresponding to the public key used in the verification is not the source of generation of the edge data group included in the communication data 40.

The edge data managing unit 24F registers the communication data 40 received at Step S300 and the verification result obtained at Step S304 so as to be associated with each other in the edge data management information 22B (Step S306). That marks the end of the present routine.

Meanwhile, if the determination at Step S302 is negative (No at Step S302), then the system control proceeds to Step S308. At Step S308, the verifying unit 24E determines whether or not the communication data 40 received at Step S300 represents the edge data having a message authentication code assigned thereto, that is, represents the first communication data 40A (Step S308).

If the determination at Step S308 is affirmative (Yes at Step S308), then the system control proceeds to Step S310. On the other hand, if the determination at Step S308 is negative (No at Step S308), then the present routine is ended.

At Step S310, the verifying unit 24E verifies the first communication data 40A, which represents the communication data 40 received at Step S300, by using the shared key registered in the second key management information 22A (Step S310). That is, the verifying unit 24E verifies the edge data included in the first communication data 40A by using the shared key that is shared between the edge device 10 and the concerned service device 20. If the verification is successful, then the verifying unit 24E verifies that the edge device 10 corresponding to the public key used in the verification is the source of generation of the edge data group included in the first communication data 40A. On the other hand, if the verification is not successful, then the verifying unit 24E verifies that the edge device 10 corresponding to the public key used in the verification is not the source of generation of the edge data group included in the first communication data 40A.

The edge data managing unit 24F registers the communication data 40 received at Step S300 and the verification result obtained at Step S310 so as to be associated with each other in the edge data management information 22B (Step S312). That marks the end of the present routine.

Meanwhile, if the determination at Step S308 is negative (No at Step S308), then the verifying unit 24E skips the verification. Subsequently, the verifying unit 24E sends the communication data 40, which is not subjected to verification, to the edge data managing unit 24F. That marks the end of the present routine. Herein, the edge data managing unit 24F either can destroy the communication data 40 that is received from the verifying unit 24E and that is not subjected to verification, or can register that communication data 40 in the edge data management information 22B.

As explained above, the communication system 1 according to the present embodiment includes the edge device 10 that generates edge data, and includes the service devices 20 that make use of the edge data. The edge device 10 includes the message authentication code generating unit 14D and the first communication unit 14F. The message authentication code generating unit 14D generates a message authentication code by using a shared key that is shared with each service device 20. The first communication unit 14F sends the first communication data 40A in which the message authentication code is assigned to the edge data. Each service device 20 includes the verifying unit 24E. In accordance with the verification result of verifying the message authentication code, which is included in the first communication data 40A, by using the shared key that is shared with the edge device 10, the verifying unit 24E verifies the source of generation of the edge data included in the first communication data 40A.

In this way, in the communication system 1 according to the present embodiment, the edge device 10 meant for providing edge data sends, to the concerned service device 20, the first communication data 40A that includes the edge data assigned with a message authentication code generated by using the shared key which is shared with the service device 20. In accordance with the verification result of verifying the message authentication code, which is included in the first communication data 40A, by using the shared key that is shared with the edge device 10, the service device 20 verifies the source of generation of the edge data. Thus, in the communication system 1 according to the present embodiment, on account of by using a shared key and a message authentication code, the verification of the source of generation can be performed with only a small processing load.

Hence, in the communication system 1 according to the present embodiment, whether or not the edge data is generated by the expected edge device 10 can be verified with only a small processing load.

Moreover, in the communication system 1 according to the present embodiment, the edge device 10 communicates with the service devices 20 via the server device 30. In this way, even when the edge device 10 and the service devices 20 do not communicate directly with each other but communicate via some other device, the communication system 1 according to the present embodiment enables verification of the generation source based on the shared keys and the message authentication codes. As a result, the verification can be performed with only a small processing load.

Furthermore, the edge device 10 of the communication system 1 according to the present embodiment can also include the digital signature processing unit 14E. When the edge data satisfies a predetermined condition, the digital signature processing unit 14E issues a digital signature to the edge data group, which is made of one or more sets of edge data satisfying the condition, by using the private key of the edge device 10. Then, in accordance with the verification result of verifying the digital signature, which is issued to the edge data included in the second communication data 40B received from the edge device 10, by using the public key of the edge device 10; the verifying unit 24E of the service device 20 verifies the source of generation of the edge data group included in the second communication data 40B. Herein, examples of the condition include a condition indicating that the data volume of the edge data is equal to or greater than the first data volume, and a condition indicating that the holding period of the edge data is equal to or greater than the first time period.

That is, in the communication system 1 according to the present embodiment, in the case of issuing a digital signature that requires a comparatively greater processing load than the case of using a message authentication code, the digital signature is issued either to such an edge data group which includes the edge data held for a period of time equal to or greater than the first time period or to such an edge data group which includes the edge data having the data volume to be equal to or greater than the first data volume. Then, in accordance with the verification result of verifying the digital signature, which is issued to the edge data group, by using the public key of the edge device 10; the verifying unit 24E of the service device 20 verifies the source of generation of the edge data group included in the second communication data 40B.

In this way, in the communication system 1 according to the present embodiment, in the case of issuing a digital signature that requires a comparatively greater processing load than the case of using a message authentication code, instead of issuing a digital signature to any edge data immediately after its generation, a digital signature is issued to the edge data group that is of some considerable volume. Then, in the communication system 1 according to the present embodiment, the verification of the generation source is performed by using the second communication data 40B that represents the edge data group having a digital signature issued thereto.

Hence, in the communication system 1 according to the present embodiment, whether or not the edge data is generated by the expected edge device 10 can be verified with only a small processing load.

First Modification Example

In the embodiment described above, the explanation was given about an example in which, when a data acquisition request is received from a particular service device 20, the edge data managing unit 34F of the server device 30 sends, to the concerned service device 20, the communication data 40 which includes the edge data requested by the data acquisition request.

Alternatively, the edge data managing unit 34F of the server device 30 can send the communication data 40 to the concerned service device 20 without waiting for a data acquisition request from the service device 20.

In that case, for example, the edge data managing unit 34F of the server device 30 confirms the message authentication code assigned to the edge data that is included in the communication data 40 received from the edge device 10, and can individually transfer the communication data 40 including the concerned edge data to the corresponding service device 20. Moreover, the edge data managing unit 34F can function as an MQTT broker (MQTT stands for MQ Telemetry Transport) and send the communication data 40, which is received from the edge device 10, without modification to the concerned service device 20 according to push-type transmission.

Second Modification Example

In the embodiment described above, the explanation was given about an example in which the shared key generating unit 24B of the service device 20 generates a shared key that is to be shared with the edge device 10, and sends the shared key to the edge device 10.

Alternatively, the shared key that is shared between the service device 20 and the edge device 10 can be generated by the edge device 10.

Figure 13:
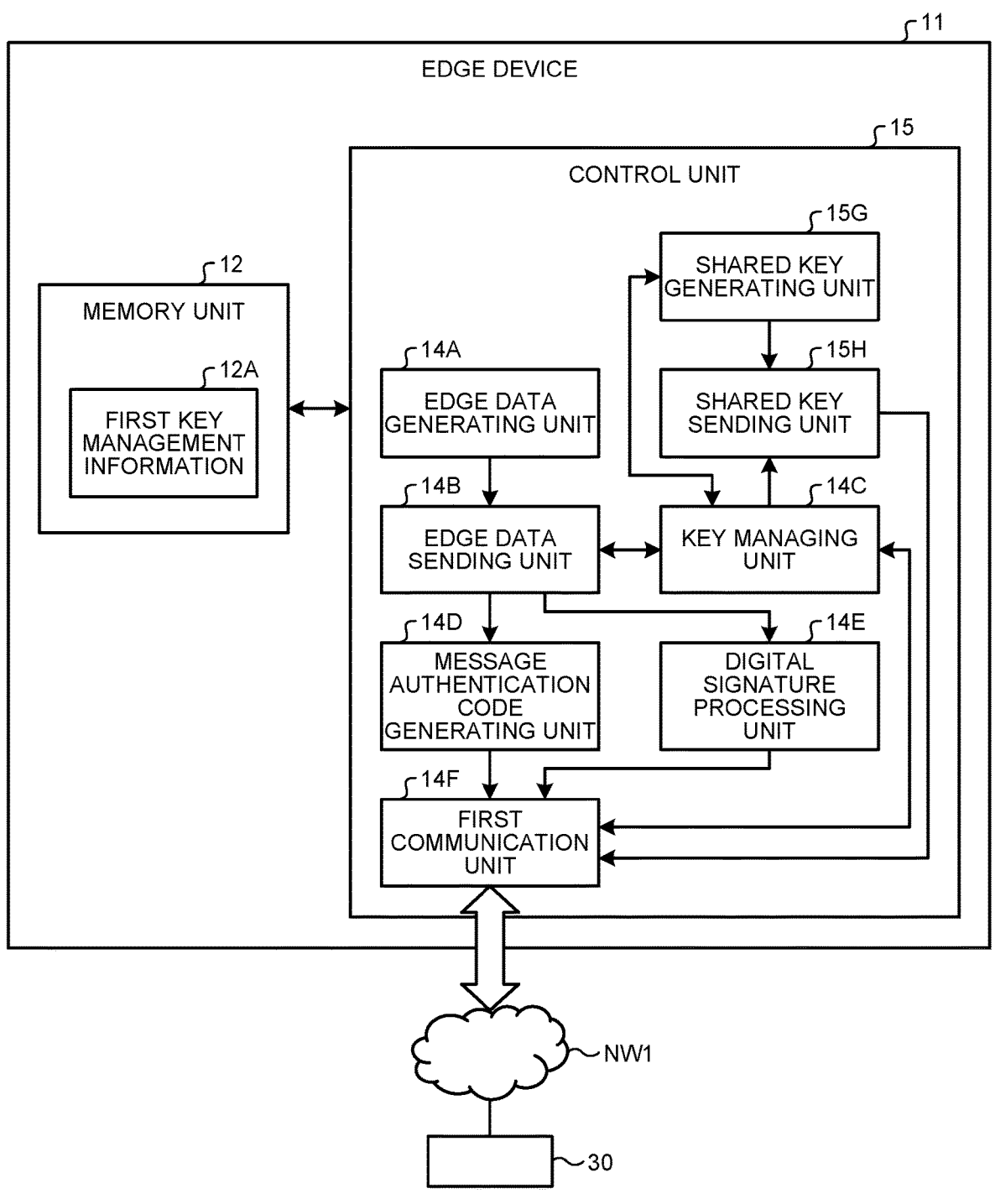
FIG. 13 is a schematic diagram illustrating a functional configuration of an edge device.

FIG. 13 is a schematic diagram illustrating an exemplary functional configuration of an edge device 11 according to a second modification example.

The edge device 11 includes the memory unit 12 and a control unit 15. The memory unit 12 and the control unit 15 are connected to each other in a manner of being able to send and receive data and signals. Thus, except for including the control unit 15 in place of the control unit 14, the edge device 11 has an identical configuration to the edge device 10 according to the embodiment described above.

The control unit 15 includes the edge data generating unit 14A, the edge data sending unit 14B, the key managing unit 14C, the message authentication code generating unit 14D, the digital signature processing unit 14E, the first communication unit 14F, a shared key generating unit 15G, and a shared key sending unit 15H. Thus, except for additionally including the shared key generating unit 15G and the shared key sending unit 15H, the control unit 15 is identical to the control unit 14 according to the embodiment described above.

The shared key generating unit 15G generates a shared key that is to be shared with a particular service device 20. At the time of generating a shared key, the shared key generating unit 15G sets the shared key value representing the value of the shared key as well as sets the shared key ID and the validity. That is, the shared key generating unit 15G generates the first key management information 12A (see FIG. 3).

The shared key sending unit 15H encrypts the shared key, which is generated by the shared key generating unit 15G, by using the public key of the concerned service device 20, and sends the post-encryption shared key to the server device 30. Then, the third communication unit 34A of the server device 30 sends the post-encryption shared key, which is received from the edge device 11, to the concerned service device 20.

The post-encryption shared key that is sent to the service device 20 can be decrypted only by using the private key of the service device 20. Hence, the shared key gets safely shared between the edge device 11 and the service device 20.

Moreover, the shared key sending unit 15H can also issue a digital signature as may be necessary, so as to protect the shared key, which is shared with the service device 20, by using the private key of the edge device 11.

Meanwhile, whether to generate a shared key in the service device 20 or in the edge device 11 can be allowed to be changed according to the manual setting performed by the user.

Third Modification Example

In the embodiment described earlier, the explanation is given about an example in which the service devices 20 included in the communication system 1 communicate with the edge device 10 via the server device 30. Alternatively, the configuration can be such that the service devices 20 perform direct communication with the edge device 10.

Figure 14:
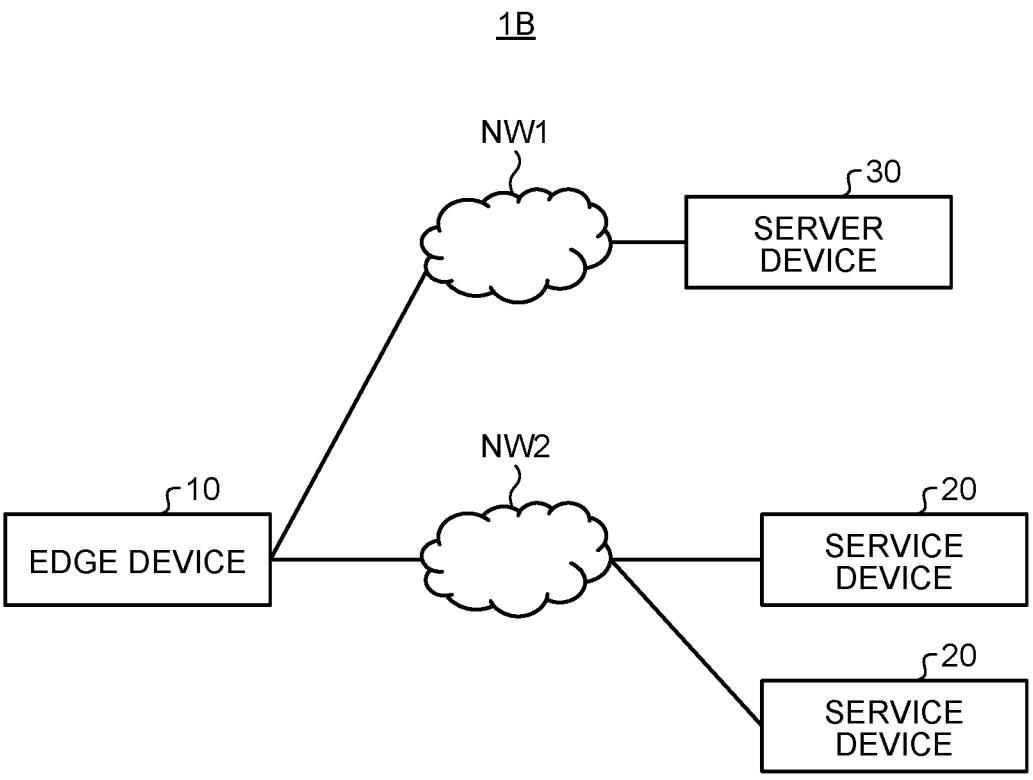
FIG. 14 is a schematic diagram illustrating a communication system.

FIG. 14 is a schematic diagram illustrating an example of a communication system 1B according to a third modification example.

The communication system 1B includes the edge device 10, the service devices 20, and the server device 30.

In the third modification example, the edge device 10 and the server device 30 are connected to each other via the first network NW1. Moreover, the edge device 10 and the service device 20 are connected to each other are connected to each other via the second network NW2.

That is, the edge device 10 is connected to the first network NW1 as well as the second network NW2. The server device 30 is connected to the first network NW1. The service devices 20 are connected to the second network NW2.

In this case, except for not performing the operation of transferring the communication data 40 to the service devices 20, the server device 30 can perform the same operations as explained in the embodiment described earlier.

Meanwhile, the communication system 1B can be configured without including the server device 30. If the communication system 1B does not include the server device 30, then the edge device 10 can be configured not to send the second communication data 40B, which represents an edge data group having a digital signature issued thereto.

Given below is the explanation of an exemplary hardware configuration of the edge device 10, the edge device 11, the service devices 20, and the server device 30 according to the embodiment and the modification examples described above.

Figure 15:
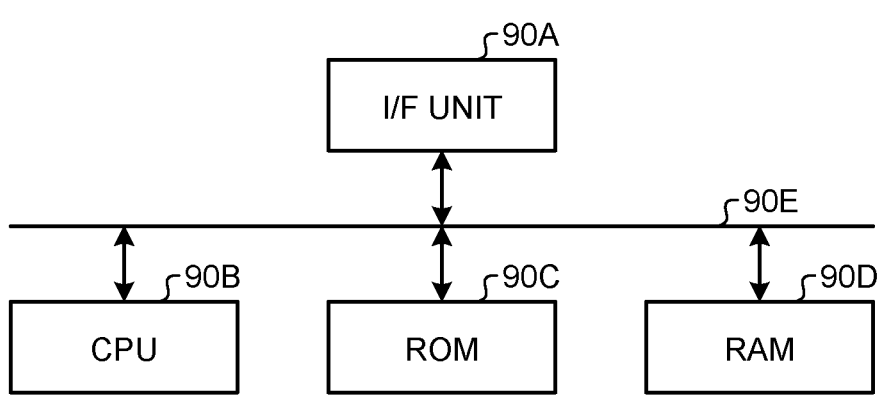
FIG. 15 is a hardware configuration diagram.

FIG. 15 is an exemplary hardware configuration diagram of the edge device the edge device 11, the service devices 20, and the server device 30 according to the embodiment and the modification examples described above.

Each of the edge device 10, the edge device 11, the service devices 20, and the server device 30 according to the embodiment and the modification examples described above has the hardware configuration of a general-purpose computer that includes a control device such as a central processing unit (CPU) 90B; memory devices such as a read only memory (ROM) 90C and a random access memory (RAM) 90D; an I/F unit representing the interface for various devices; and a bus 90E that connects the constituent elements to each other.

In each of the edge device 10, the edge device 11, the service devices 20, and the server device 30 according to the embodiment and the modification examples described above, the CPU 90B reads a computer program from the ROM 90C into the RAM 90D, and executes the computer program so that the corresponding function units get implemented in the computer.

Meanwhile, the computer program meant for implementing the operations performed in each of the edge device 10, the edge device 11, the service devices 20, and the server device 30 according to the embodiment and the modification examples described above can be stored in advance in the corresponding ROM 90C.

Alternatively, the computer program meant for implementing the operations performed in each of the edge device 10, the edge device 11, the service devices 20, and the server device 30 according to the embodiment and the modification examples described above can be stored as an installable file or an executable file in a computer-readable memory medium such as a compact disc read only memory (CD-ROM), a compact disc recordable (CD-R), a digital versatile disc (DVD), or a flexible disk (FD); and can be provided as a computer program product. Still alternatively, the computer program meant for implementing the operations performed in each of the edge device the edge device 11, the service devices 20, and the server device 30 according to the embodiment and the modification examples described above can be stored in a downloadable manner in a computer connected to a network such as the Internet. Still alternatively, the computer program meant for implementing the operations performed in each of the edge device 10, the edge device 11, the service devices 20, and the server device 30 according to the embodiment and the modification examples described above can be distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system, comprising:

an edge device for generating edge data, the edge device comprising one or more first hardware processors coupled to a first memory; and a service device for receiving the edge data, the service device comprising one or more second hardware processors coupled to a second memory, wherein:

the edge device is configured to communicate with the service device via a server device, the one or more first hardware processors are configured to:

generate a message authentication code by using a shared key shared with the service device; and transmit first communication data representing communication data in which the message authentication code is assigned to the edge data, the one or more second hardware processors are configured to verify a source of generation of the edge data included in the first communication data, the verification being performed in accordance with a verification result of verifying the message authentication code included in the first communication data by using a shared key shared with the edge device, wherein the one or more first hardware processors are further configured to:

issue a digital signature to an edge data group by using a private key of the edge device when the edge data satisfies a predetermined condition, the edge data group being made of one or more sets of the edge data satisfying the predetermined condition; and transmit, as the communication data, at least either the first communication data or second communication data, the second communication data representing the edge data group to which the digital signature has been issued, and the predetermined condition indicates that a data volume of the edge data is equal to or greater than a first data volume or that a holding period of the edge data is equal to or greater than a first time period.

2. The communication system according to claim 1 wherein the one or more second hardware processors are further configured to verify a source of generation of the edge data group included in the second communication data in accordance with a verification result of verifying the digital signature issued to the edge data included in the second communication data by using a public key of the edge device.

3. The communication system according to claim 1, wherein:

the edge device is configured to store, in advance, first key management information in which service identification information identifying the service device and a shared key are associated with each other, the shared key being shared with the service device identified by the service identification information, and the service device is configured to store, in advance, second key management information in which edge identification information identifying the edge device and a shared key shared with the edge device are associated with each other.

4. The communication system according to claim 3, wherein the one or more first hardware processors are further configured to generate, by using one or more shared keys registered in the first key management information, the message authentication code for each service device identified by the service identification information corresponding to the shared key.

5. The communication system according to claim 1, wherein the one or more second hardware processors are further configured to:
   generate a shared key to be shared with the edge device;
   encrypt the generated shared key by using a public key of the edge device; and
   transmit a post-encryption shared key.

6. The communication system according to claim 1, wherein the one or more first hardware processors are further configured to:
   generate a shared key to be shared with the service device;
   encrypt the generated shared key by using a public key of the service device; and
   transmit a post-encryption shared key.

7. The communication system according to claim 1 further comprising the server device, the server device comprising one or more third hardware processors coupled to a third memory, wherein:
   the server device is connected to the edge device via a first network,
   the server device is connected to the service device via a second network, and
   the one or more third hardware processors are configured to transmit, to the service device via the second network, the communication data received from the edge device via the first network.

8. The communication system according to claim 7, wherein the one or more third hardware processors are further configured to, when a data acquisition request is received from the service device, transmit the communication data to the service device, the communication data including the edge data requested by the data acquisition request.

9. The communication system according to claim 8, wherein the one or more third hardware processors are further configured to:
   transmit, to the service device, the first communication data including the message authentication code and the edge data in a case where the message authentication code is assigned to the communication data including the edge data requested by the data acquisition request, and
   transmit, to the service device, the second communication data representing the communication data in a case where the message authentication code is not assigned to the communication data including the edge data requested by the data acquisition request and the digital signature is issued to the edge data group including the edge data requested by the data acquisition request.

10. An information processing device generating edge data, the information processing device comprising:
   one or more hardware processors coupled to a memory, the one or more hardware processors being configured to:
      generate a message authentication code by using a shared key shared with a service device; and
      transmit first communication data representing communication data in which the message authentication code is assigned to the edge data,
   wherein the information processing device is configured to communicate with the service device via a server device,
   wherein the one or more hardware processors are further configured to:

issue a digital signature to an edge data group by using a private key of the information processing device when the edge data satisfies a predetermined condition, the edge data group being made of one or more sets of the edge data satisfying the predetermined condition; and
   transmit, as the communication data, at least either the first communication data or second communication data, the second communication data representing the edge data group to which the digital signature has been issued, and
   wherein the predetermined condition indicates that a data volume of the edge data is equal to or greater than a first data volume or that a holding period of the edge data is equal to or greater than a first time period.

11. An information processing method implemented by a computer for generating edge data, the information processing method comprising:
   generating a message authentication code by using a shared key shared with a service device; and
   transmitting first communication data representing communication data in which the message authentication code is assigned to the edge data,
   wherein the computer is configured to communicate with the service device via a server device and is,
   wherein the computer is further configured to:
      issue a digital signature to an edge data group by using a private key of the computer when the edge data satisfies a predetermined condition, the edge data group being made of one or more sets of the edge data satisfying the predetermined condition; and
      transmit, as the communication data, at least either the first communication data or second communication data, the second communication data representing the edge data group to which the digital signature has been issued, and
   wherein the predetermined condition indicates that a data volume of the edge data is equal to or greater than a first data volume or that a holding period of the edge data is equal to or greater than a first time period.

12. A computer program product comprising a non-transitory computer-readable recording medium on which a computer program executable by a computer is recorded, the computer program instructing the computer to:
   generate a message authentication code by using a shared key shared with a service device; and
   transmit first communication data representing communication data in which the message authentication code is assigned to edge data,
   wherein the computer program further configures the computer to communicate with the service device via a server device,
   wherein the computer program further configures the computer to:
      issue a digital signature to an edge data group by using a private key of the computer when the edge data satisfies a predetermined condition, the edge data group being made of one or more sets of the edge data satisfying the predetermined condition; and
      transmit, as the communication data, at least either the first communication data or second communication data, the second communication data representing the edge data group to which the digital signature has been issued, and
   wherein the predetermined condition indicates that a data volume of the edge data is equal to or greater than a first data volume or that a holding period of the edge data is equal to or greater than a first time period.

13. An information processing device connected to an edge device via a first network and connected to a service device via a second network, the edge device for generating edge data, the service device for receiving the edge data, the information processing device comprising:

one or more hardware processors coupled to a memory, the one or more hardware processors being configured to transmit, to the service device via the second network, first communication data received from the edge device via the first network, the first communication data being data in which a message authentication code generated by using a shared key shared with the edge device has been assigned to the edge data, wherein the service device is configured to communicate with the edge device via the information processing device and is, wherein the edge device is further configured to:

issue a digital signature to an edge data group by using a private key of the edge device when the edge data satisfies a predetermined condition, the edge data group being made of one or more sets of the edge data satisfying the predetermined condition; and transmit, as the communication data, at least either the first communication data or second communication data, the second communication data representing the edge data group to which the digital signature has been issued, and wherein the predetermined condition indicates that a data volume of the edge data is equal to or greater than a first data volume or that a holding period of the edge data is equal to or greater than a first time period.

14. An information processing device for receiving edge data generated by an edge device, the information processing device comprising:

one or more hardware processors coupled to a memory, the one or more hardware processors being configured to verify source of generation of the edge data included in first communication data in which a message authentication code is assigned to the edge data, the verification being performed in accordance with verification result of verifying the message authentication code included in the first communication data by using a shared key shared with the edge device, wherein the information processing device is configured to communicate with the edge device via a server device and is unable to communicate directly with the edge device wherein the edge device is further configured to:

issue a digital signature to an edge data group by using a private key of the edge device when the edge data satisfies a predetermined condition, the edge data group being made of one or more sets of the edge data satisfying the predetermined condition; and transmit, as the communication data, at least either the first communication data or second communication data, the second communication data representing the edge data group to which the digital signature has been issued, and wherein the predetermined condition indicates that a data volume of the edge data is equal to or greater than a first data volume or that a holding period of the edge data is equal to or greater than a first time period.

15. The communication system of claim 1, wherein the predetermined condition includes when a data volume of the edge data is equal to or greater than one of:

an expected data volume of a single set of edge data;

an expected average data volume of plural sets of edge data; and an expected maximum data volume of the plural sets of edge data.

16. The communication system according to claim 1, wherein the first data volume is an expected data volume of a single set of the edge data, an expected average data volume of the edge data, or an expected maximum data volume of the edge data.

17. The communication system according to claim 1, wherein the first time period is a period exceeding a period of time required to hold a data volume exceeding an expected data volume of a single set of the edge data, exceeding an expected average data volume of the edge data, or exceeding an expected maximum data volume of the edge data.

* * * * *